(No Model.)

A. P. CLARKE.
MANUFACTURE OF RAKES.

No. 323,913. Patented Aug. 11, 1885.

Attest:
F. H. Schott
A. R. Brown.

Inventor:
Alanson P. Clarke
By C. H. Watson & Co.

UNITED STATES PATENT OFFICE.

ALANSON P. CLARKE, OF AUBURN, NEW YORK.

MANUFACTURE OF RAKES.

SPECIFICATION forming part of Letters Patent No. 323,913, dated August 11, 1885.

Application filed December 27, 1883. (No model.)

*To all whom it may concern:*

Be it known that I, ALANSON P. CLARKE, a citizen of the United States, residing at Auburn, in the county of Cayuga and State of New York, have invented certain new and useful Improvements in Rakes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention has relation to certain new and useful improvements in the process of forming rakes, as will be hereinafter more fully described and claimed.

Figure 1:
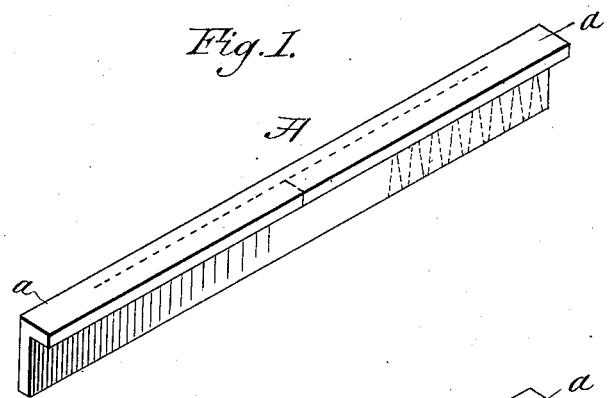
Figure 2:
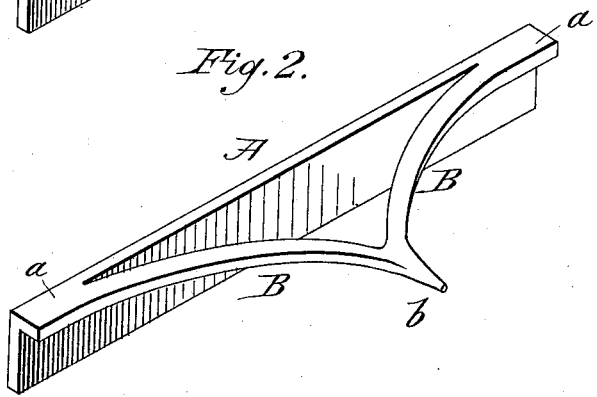

In the annexed drawings, Figure 1 is a perspective view of the blank from which the rake is formed, and Fig. 2 is a similar view showing the rake formed with braces and tang ready for insertion in a handle.

A represents the blank or bar, made of steel or iron, from which the head, braces, and teeth are formed. This blank is provided with a flange or projecting portion, $a$, extending its entire length. From this flange $a$ the braces B B are made by cutting or shearing the blank through the flange from the center toward each end a proper distance, as shown by the dotted lines in Fig. 1. This stock or severed portion is turned away from the bar or blank A and bent and drawn out into a proper shape to form the braces, which are brought together and welded at their ends to form a tang, $b$, which is to be driven into a suitable handle, as shown in Fig. 2. From the lower part of the shank or bar A the teeth will be cut out in the usual form, as indicated by the dotted lines in Fig. 1. By this method of cutting or shearing the head or blank from the flange $a$, along the dotted lines shown in Fig. 1, from its center toward the ends, the braces are made more effective by leaving the head of the rake nearer at its ends and farther at its center from the end of the handle than if the braces were cut from a plain piece without the flange, or if they were cut from the ends toward the center and then bent to form the braces and shank, as has been heretofore done.

Having thus described my invention, what I claim as new, and desire to secure by Letters Patent, is—

The process herein described of forming rakes, which consists in first producing a blank of triangular cross-section, then splitting the head-plate from the center inward, and also splitting it at right angles thereto in the direction of each end, but leaving such ends intact, then bending out and drawing out the split portions to form braces, and welding their ends together to form a tang, as specified.

In testimony whereof I affix my signature in presence of two witnesses.

ALANSON P. CLARKE.

Witnesses:
    THOMAS D. BOAK,
    CHARLES E. STEVENS.